United States Patent [19]

Rodeghiero

[11] 4,046,162

[45] Sept. 6, 1977

[54] MODULATION CONTROL VALVE FOR CLUTCHES

[75] Inventor: Reno Antonio Rodeghiero, Hudson, Iowa

[73] Assignee: Deere & Company, Moline, Ill.

[21] Appl. No.: 686,566

[22] Filed: May 14, 1976

[51] Int. Cl.² .................... F16K 31/12; F16D 25/00
[52] U.S. Cl. ............................. 137/489; 192/109 F
[58] Field of Search .................. 192/109 F, 85 R; 137/489

[56] References Cited

U.S. PATENT DOCUMENTS

| 2,721,640 | 10/1955 | Feo et al. | 192/109 F |
| 3,583,422 | 6/1971 | Dach et al. | 137/505.14 |
| 3,656,600 | 4/1972 | Kitano et al. | 192/109 F |

FOREIGN PATENT DOCUMENTS

| 46-24924 | 10/1968 | Japan | 192/109 F |

*Primary Examiner*—Benjamin W. Wyche

[57] ABSTRACT

A modulation control valve includes a modulating valve coupled by springs to an accumulator piston with both fluidly connected to a reservoir valve. The modulating valve is moved by pressurized fluid in an inlet port connected thereto when a predetermined fill pressure is reached. The fluid in the outlet port pressurizes the accumulator piston to move it to urge the modulating valve to pressure modulate fluid flow between the inlet and an outlet ports. Pressurized fluid in the outlet port acts on a return spring end of the reservoir valve to prevent the accumulator piston and on the other end of the reservoir valve from being relieved to a fluid reservoir. When the accumulator piston abuts the modulating valve, the inlet and outlet ports will be placed in full fluid communication to end modulation. Sudden demands acting on the modulation control valve reduce the pressure in the outlet port causing the accumulator piston pressure to move the reservoir valve to block the spring end of the reservoir valve from the outlet port and allow the accumulator piston pressure to be relieved past the reservoir valve. When the accumulator piston is relieved, the return spring urges the reservoir valve back to its initial position.

4 Claims, 1 Drawing Figure

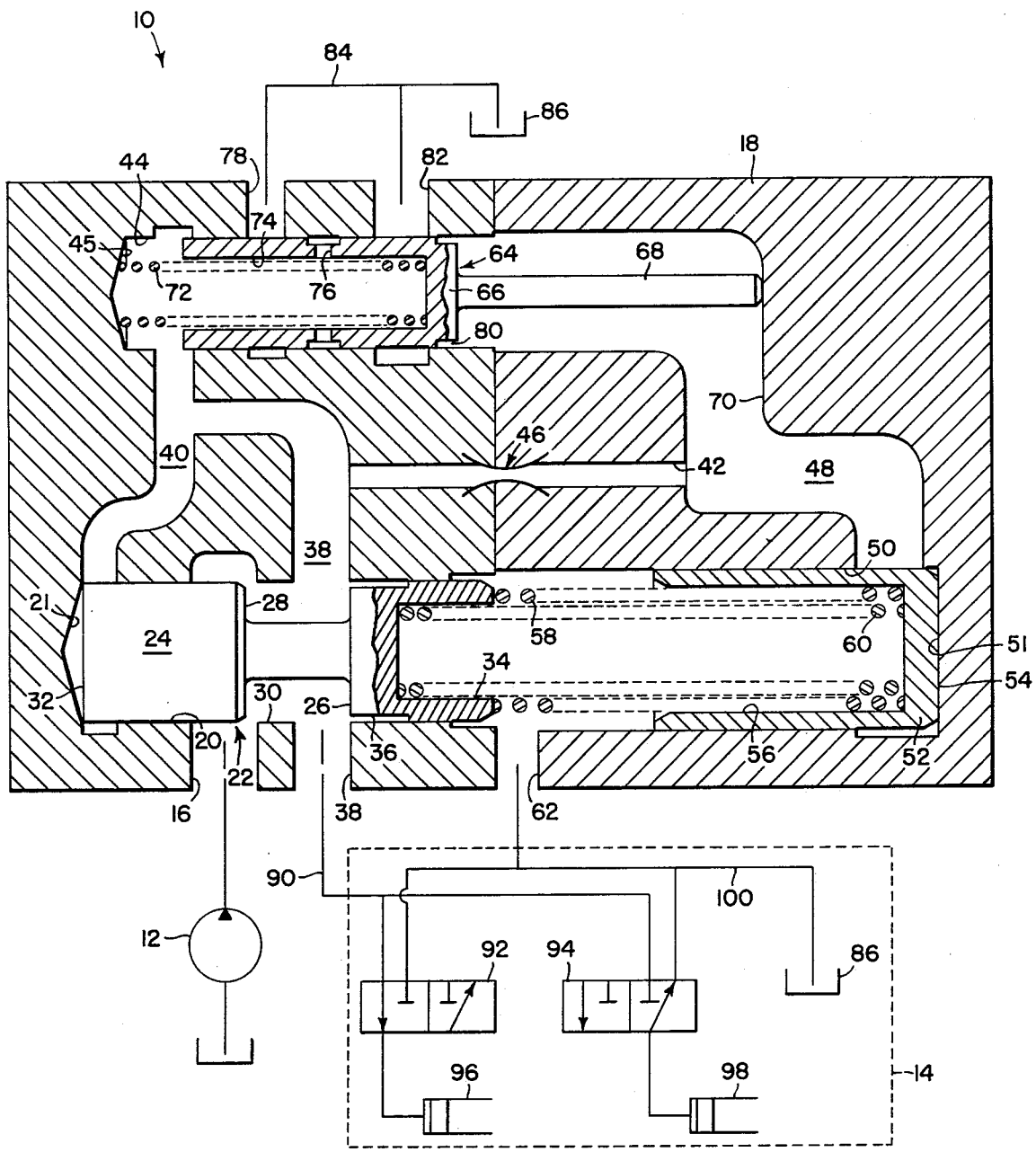

MODULATION CONTROL VALVE FOR CLUTCHES

BACKGROUND OF THE INVENTION

The present invention relates generally to shift modulation controls for transmissions and more particularly to a modulation control valve for a power shift transmission.

In the past, shift modulation control valve operated in conjunction with low capacity pumps and high volume transmissions as disclosed in the U.S. Pat. No. 3,386,540 granted to J. Horsch et al. In these systems, when a sudden demand in the transmission caused the reservoir valve to open under urging of the pressurized fluid from the accumulator piston, the time lag for the pump to fill the transmission was large enough to allow the fluid pressure from the accumulator piston to be completely dissipated. With larger pumps and the desire for faster filling of the transmissions, the time lag has decreased until the accumulator piston cannot be completely relieved and thus the modulation control valve cannot operate properly.

SUMMARY OF THE INVENTION

The present invention provides a modulation control valve operable with high capacity and high fluid volume transmissions.

The modulation control valve includes a modulating valve spring-coupled to an accumulator piston with both connected to a reservoir valve which is operable under modulation pressure at the modulating valve to block the pressurized accumulator piston from the reservoir and under a sudden loss of pressure at the modulating valve to connect the accumulator piston to the reservoir until the pressure thereat is dissipated.

The above and additional advantages of the present invention will become apparent to those skilled in the art from a reading of the following detailed description when taken in conjunction with the accompanying drawing.

DESCRIPTION OF THE PREFERRED EMBODIMENT

Referring now to the drawing, therein is shown a modulation control valve generally designated by the numeral 10 which is supplied with pressurized fluid from a constant pressure fluid pump 12 which in a vehicle would be a transmission pump. The modulation control valve 10 is further connected to a conventional power shift transmission generally designated by the numeral 14 which will be described in greater detail later.

The pump 12 is connected to an inlet port 16 in the valve body 18 of the modulation control valve 10. The inlet port is connected to a modulating valve bore 20 which contains a modulating valve 22. The modulating valve 22 consists of a modulating spool 24 having an annular groove 26 provided therein along one edge of which is provided a metering edge 28. The metering edge 28 cooperates with a portion of the modulating valve bore 20 which defines a metering bore 30. The modulating spool 24 has a spool surface 32 on the end abutting the closed end of the modulating valve bore 20 and contains a counterbore 34 in the opposite end. The end with the counterbore 34 further contains relief lands 36 on its outer perimeter proximate the groove 26.

The metering bore 30 connects the inlet port 16 with an outlet port 38. The outlet port 38 connects with the power shift transmission 14, a modulating passageway 40 and an orifice passageway 42. The modulating passageway 40 connects with the modulating valve bore 20 at the closed end and with a reservoir valve bore 44 proximate its closed end.

The orifice passageway 42 contains a shift orifice 46 and connects the outlet port 38 to an accumulator passage 48.

The accumulator passageway 48 is connected to one end of an accumulator bore 50 which is concentric with and faces the open end of the modulating valve bore 20. An accumulator piston 52 having a piston surface 54 is disposed within the accumulator bore 50 and slidable therein. The accumulator piston 52 has a counterbore 56 provided therein in which a fill pressure spring 58 is positioned to abut one end of the modulating spool 24. Nestled within the fill pressure spring 58 is a modulating spring 60 which is positioned in the counterbore 34 of the modulating spool 24. Positioned in the valve body 18 between the modulating spool 24 and the accumulator piston 52 is a relief port 62 which is connected to the power shift transmission 14.

The accumulator passageway 48 is further connected to the open end of the reservoir valve bore 44. Positioned within the reservoir valve bore 44 is a reservoir valve generally designated by the numeral 64. The reservoir valve 64 includes a reservoir valve spool 66 having an extension 68 which abuts a wall 70 of the accumulator passageway 48 to provide a stop for the reservoir valve spool 66. The reservoir valve spool 66 is urged to the stopped position by a return spring 72 positioned within a counterbore 74 in the reservoir valve spool 66. An exhaust port 76 is medially positioned within the reservoir valve spool 66 so as to be selectively blocked and connected to a first reservoir port 78. The reservoir valve spool 66 further contains exhaust channels 80 which are selectively connected and blocked from a secnd reservoir port 82. The first and second reservoir ports 78 and 82 are connected by a reservoir line 84 to a fluid reservoir 86.

Referring now to the power shift transmission 14, therein is shown a simplified schematic of the components generally present in a conventional vehicle transmission. A transmission line 90 is shown connecting the outlet port 38 to the inlet ports of a first and second control valves 92 and 94. The control valves 92 and 94 are two-position valves which in a first position connect the transmission line 90 to a first and second cylinders 96 and 98, respectively, and in a second position connect the first and second cylinders 96 and 98 through a reservoir line 100 to the reservoir 86. The first and second cylinders 96 and 98 are respectively representative of brakes and clutches in the power shift transmission 14.

In operation, the modulation control valve 10 starts off in the position shown in the drawing. Pressurized fluid is supplied from the pump 12 to the inlet port 16 to pass through the metering bore 30 into the outlet port 38. With the first control valve 92 open, there will be flow at relatively low pressure from the outlet port 38 to the first cylinder 96 until the first cylinder 96 reaches the end of its travel and the pressure begins to build therein.

The first effect of the pressure building in the outlet port 38 is felt at the closed end 21 and 45 of the modulating spool 24 and the reservoir valve spool 66, respectively via the modulating passageway 40. Further, fluid begins to flow from the output port 38 through the shift orifice 46 into the accumulator passageway 48.

The pressure on the modulating spool surface 32 will increase until it exceeds a predetermined flow pressure as determined by the preload on the fill pressure spring 58. Once the predetermined fill pressure is exceeded, the modulating spool 24 will be urged to a position where it will block the inlet port 16 from the outlet port 38.

In the event of a sharp pressure rise in the outlet port sufficient to suddenly overcome the predetermined fill pressure, so as to cause the modulating spool 24 to overshoot the metering bore 30, the relief land 36 will be placed in communication with the relief port 62 to allow relief of the excess pressure.

As the metering edge 28 of the modulating spool 24 begins to close off the metering bore 30, the pressure in the outlet port 38 will be transmitted through the shift orifice 46 with some minor pressure drop to the accumulator bore 50 so as to cause compression of the fill pressure and modulating springs 58 and 60 to urge the metering edge 28 away from the metering bore 30. This is the beginning of modulation wherein increases in the outlet port pressure affecting the modulating spool 24 will also effect the counterbalancing effect of the pressure on the accumulator piston 52 so as to provide a uniform pressure rise in the outlet port 38. The accumulator piston surface 54 is sized to be slightly larger than the modulating spool surface 32 so as to always assure that the pressure in the accumulator bore 50 will be less than in the modulating valve bore 20. As will be evident to those skilled in the art, the uniform spring rates of the fill pressure and modulating springs 58 and 60 provide a uniform pressure rise while the diameter of the shift orifice 46 determines the rate at which the pressure rises.

Since the pressure rise in the outlet port 38 is faster during the modulation stage than in the accumulator passageway 48, the pressure in the closed end 45 of the reservoir valve bore 44 is greater than in the open end thereof and thus the reservoir valve 64 blocks the first and second reservoir ports 78 and 82.

The shift modulation control valve provides a uniform pressure rise to the clutch and brake elements so as to provide a smooth shift engagement of the power shift transmission.

When the accumulator piston 52 reaches a pre-set pressure as established by the fill pressure and modulating spring loads, the springs 58 and 60 go solid and the accumulator piston 52 abuts the modulating spool 24 to force the modulating valve 22 into the full open position. This is the end of modulation.

When a shift is made of the first control valve 92 into its second position and the second control valve 94 into its first position, the oil pressure in the outlet port 38 will suddenly decrease due to a high flow demand in the second cylinder 98.

When the pressure in the outlet port 38 drops, the pressure in the spring end of the reservoir valve 64 also drops allowing the pressure in the accumulator passageway 48 to force the reservoir valve spool 66 to compress the return spring 72. As the reservoir valve spool 66 moves, the modulating passageway 40 is blocked from the reservoir valve bore 44 and the reservoir valve bore 44 is exhausted through the exhaust port to the first reservoir port 78. With only the return spring 72 acting against the pressure in the accumulator pasageway 48, the pressure in the accumulator passageway 48, and thus in the accumulator bore 50, is substantially reduced to zero through the exhaust channels 80 to the second reservoir port 82. As the pressure decreases to zero in the accumulator bore 50, the accumulator piston 52 moves back to the closed end 51 of the accumulator bore 50.

When the pressure in the accumulator passageway 48 has been relieved, the return spring 72 will bring the reservoir valve spool 66 towards its original position until the extension 68 abuts the wall 70 of the accumulator passageway 48 to stop further movement of the reservoir valve spool 66. The modulation control valve 10 is then again ready to repeat the modulation cycle when the control valves 92 and 94 are repositioned.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

I claim:

1. A modulation control valve comprising: a valve body having provided therein a modulating valve bore, an accumulator bore concentric with and connected at a first end to the modulating valve bore, and a reservoir valve bore; said valve body having inlet and outlet ports provided therein connected to the modulating valve bore between the ends and having a modulating passageway connecting the outlet port to a first end of the modulating valve bore and to the reservoir valve bore proximate a first end thereof; said valve body having an accumulator passageway provided therein connecting a second end of the accumulator bore with a second end of the reservoir valve bore and having an orificed passageway provided therein connecting the outlet port and the accumulator passageway; said valve body having a first and second reservoir ports provided therein connected to the reservoir valve bore between the ends thereof; a modulating spool slidably positioned in the modulating valve bore movable between a first and second positions wherein fluid communication between the inlet and outlet ports is respectively afforded and blocked; an accumulator piston slidably positioned in the accumulator bore and movable towards and away from the modulating spool; biasing means interposed between the accumulator piston and the modulating spool to urge the modulating spool to afford fluid communication between the inlet and outlet ports when the accumulator and piston is moved towards the modulating spool; and a reservoir valve spool slidably positioned in the reservoir valve bore and movable in response to fluid pressure in the modulating passageway to a first position wherein the modulating passageway is connected to the reservoir valve bore, the reservoir valve bore is blocked from the first reservoir port, and the accumulator passageway is blocked from the second reservoir port and movable in response to fluid pressure in the accumulator passageway to a second position wherein the modulating passageway is blocked from the reservoir valve bore, the reservoir valve bore is connected to the first reservoir port, and the accumulator passageway is connected to the second reservoir port.

2. The modulation control valve claimed in claim 1 wherein the biasing means include preload means for establishing a predetermined fill pressure.

3. In combination with a power shift transmission, a modulation control valve comprising: a valve body having provided therein a modulating valve bore, an accumulator bore concentric with and connected at a first end to the modulating valve bore, and a reservoir valve bore; said valve body having inlet and outlet ports provided therein connected to the modulating valve bore between the ends and having a modulating passageway connecting the outlet port to a first end of the modulating valve bore and to the reservoir valve bore proximate a first end thereof; said valve body having an accumulator passageway provided therein connecting a second end of the accumulator bore with a second end of the reservoir valve bore and having an orificed passageway provided therein connecting the outlet port and the accumulator passageway; said valve body having a first and second reservoir ports provided therein connected to the reservoir valve bore between the ends thereof; a modulating spool slidably positioned in the modulating valve bore movable between a first and second positions wherein fluid communication between the inlet and outlet ports is respectively afforded and blocked; an accumulator piston slidably positioned in the accumulator bore and movable towards and away from the modulating spool; biasing means interposed between the accumulator piston and the modulating spool to urge the modulating spool to afford fluid communication between the inlet and outlet ports when the accumulator and piston is moved towards the modulating spool; and a reservoir valve spool slidably positioned in the reservoir valve bore and movable in response to fluid pressure in the modulating passageway to a first position wherein the modulating passageway is connected to the reservoir valve bore, the reservoir valve bore is blocked from the first reservoir port, and the accumulator passageway is blocked from the second reservoir port and movable in response to fluid pressure in the accumulator passageway to a second position wherein the modulating passageway is blocked from the reservoir valve bore, the reservoir valve bore is connected to the first reservoir port, and the accumulator passageway is connected to a second reservoir port.

4. The modulation control valve claimed in claim 3 wherein the biasing means includes preload means for establishing a predetermined fill pressure prior to which the modulating valving means will not respond to pressure in the outlet port.

* * * * *